United States Patent
Stojanovski

(10) Patent No.: US 7,234,902 B2
(45) Date of Patent: Jun. 26, 2007

(54) MILLING TOOL HOLDER WITH CAMMING PLUG

(76) Inventor: Stojan Stojanovski, 13300 W. Star Dr., Shelby Township, MI (US) 48315

( * ) Notice: Subject to any disclaimer, the term of this patent is extended or adjusted under 35 U.S.C. 154(b) by 415 days.

(21) Appl. No.: 11/029,826

(22) Filed: Jan. 6, 2005

(65) Prior Publication Data

US 2005/0117988 A1 Jun. 2, 2005

Related U.S. Application Data

(63) Continuation-in-part of application No. 10/883,052, filed on Jul. 2, 2004, now Pat. No. 7,044,695, and a continuation-in-part of application No. 10/812,784, filed on Mar. 31, 2004, now Pat. No. 6,964,547, and a continuation-in-part of application No. 10/693,418, filed on Oct. 27, 2003, now Pat. No. 6,971,825.

(51) Int. Cl.
*B23C 5/22* (2006.01)
*B23C 1/00* (2006.01)

(52) U.S. Cl. .............. 409/234; 409/233; 409/232; 408/23 PA; 408/233; 279/8; 407/36; 407/40; 407/41; 407/48

(58) Field of Classification Search ............... 409/231, 409/232, 233, 234; 408/231, 232, 233, 238, 408/239 R, 239 A; 279/8, 143, 145; 82/158, 82/159, 160; 403/373, 374.1, 374.2, 374.3, 403/374.4; 407/33, 34, 36, 40, 41, 42, 47, 407/48, 49, 54; 411/60.2, 55, 57.1, 271, 411/325

See application file for complete search history.

(56) References Cited

U.S. PATENT DOCUMENTS

| | | | | |
|---|---|---|---|---|
| 3,776,656 A * | 12/1973 | Benjamin | ................... | 408/233 |
| 4,525,110 A * | 6/1985 | Stojanovski | ................. | 407/40 |
| 4,545,711 A * | 10/1985 | Dooley | ....................... | 408/197 |
| 4,611,960 A * | 9/1986 | Quenneville et al. | ....... | 409/234 |
| 4,645,383 A * | 2/1987 | Lindsay | ...................... | 407/36 |
| 4,813,829 A * | 3/1989 | Koppelmann | ............... | 409/136 |
| 5,421,681 A * | 6/1995 | Stephens | .................... | 408/168 |
| 5,468,102 A * | 11/1995 | Stojanovski | ................ | 409/234 |
| 5,580,194 A * | 12/1996 | Satran et al. | ................. | 407/40 |
| 5,632,576 A * | 5/1997 | Storch | .......................... | 407/32 |
| 5,782,589 A * | 7/1998 | Cole | ........................... | 408/233 |
| 5,863,157 A * | 1/1999 | Harano et al. | ................. | 407/42 |
| 5,904,448 A * | 5/1999 | Lee et al. | ...................... | 407/42 |
| 5,921,719 A * | 7/1999 | Laflamme | ..................... | 407/40 |
| 6,158,927 A * | 12/2000 | Cole et al. | .................... | 407/48 |
| 6,264,409 B1 * | 7/2001 | Date et al. | ................... | 409/233 |
| 6,270,086 B1 * | 8/2001 | Lloyd | ........................... | 279/51 |
| 6,287,059 B1 * | 9/2001 | Hashidate et al. | ........... | 409/233 |
| 6,457,920 B1 * | 10/2002 | Kleiner | ....................... | 409/232 |
| 6,575,670 B2 * | 6/2003 | Men | ............................. | 407/42 |
| 2002/0094244 A1* | 7/2002 | Satran et al. | ................. | 407/33 |
| 2005/0175422 A1* | 8/2005 | Jhang | .......................... | 407/54 |

* cited by examiner

*Primary Examiner*—Dana Ross
(74) *Attorney, Agent, or Firm*—Charles W. Chandler

(57) ABSTRACT

A milling tool holder apparatus includes a tool holder having a male structure received in a female opening of a shank, and a camming plug received in a transverse plug-receiving opening in the shank and the tool holder. Turning the camming plug in one direction moves the male structure axially to a locked position. Turning the camming plug in the opposite direction moves the male structure axially to a release position.

19 Claims, 9 Drawing Sheets

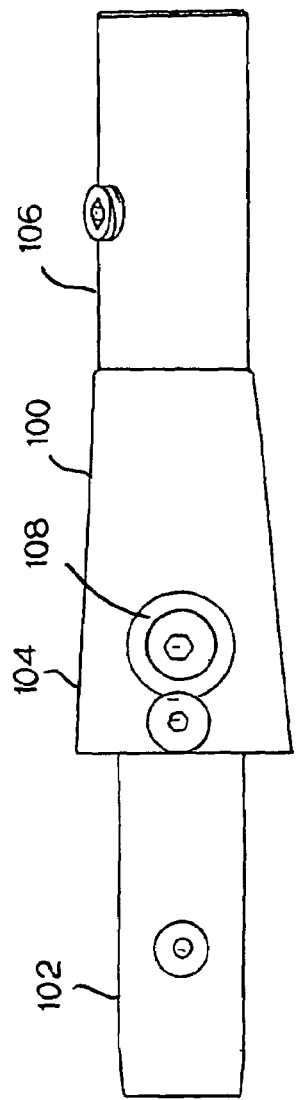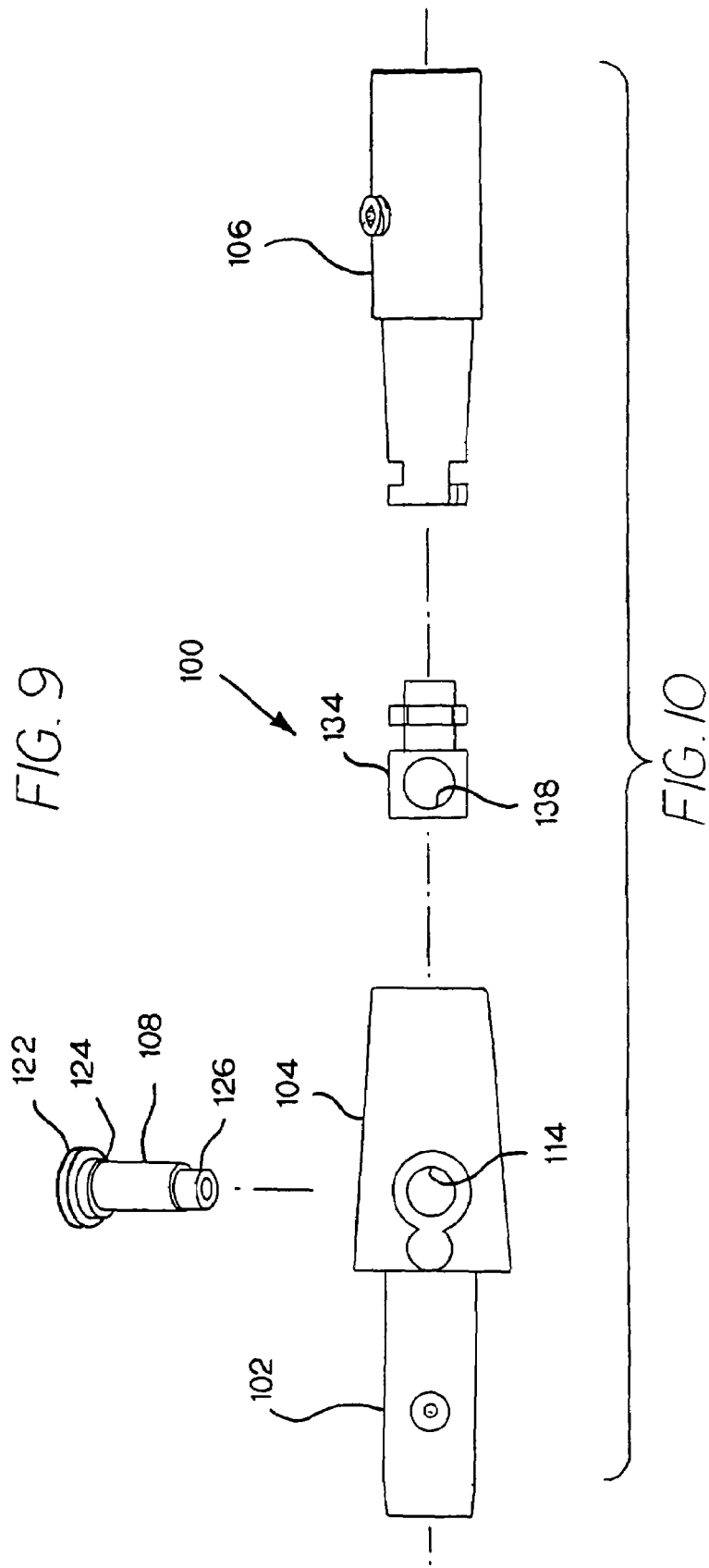

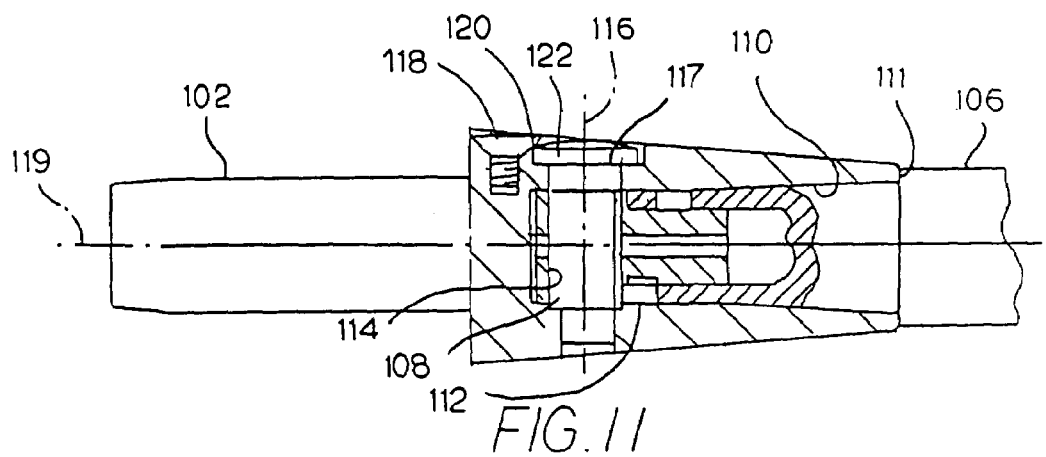
FIG.11
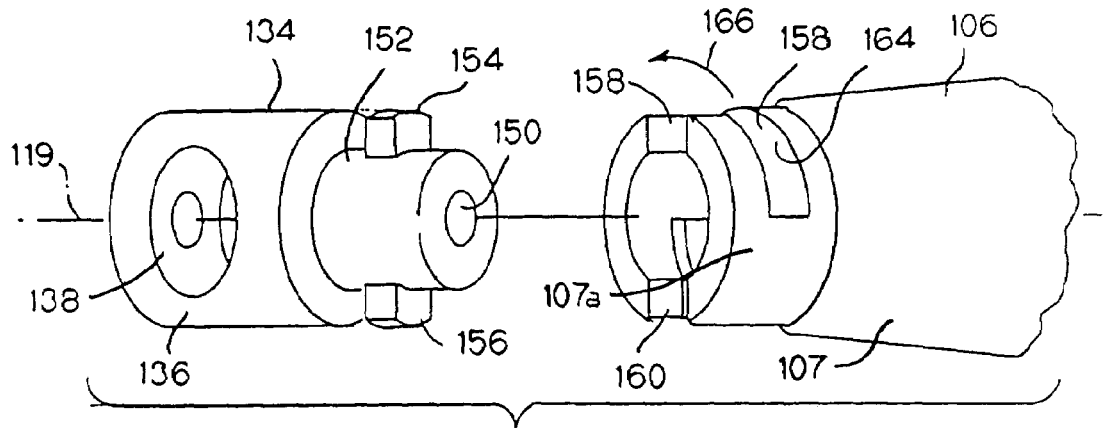
FIG.12
FIG.12A
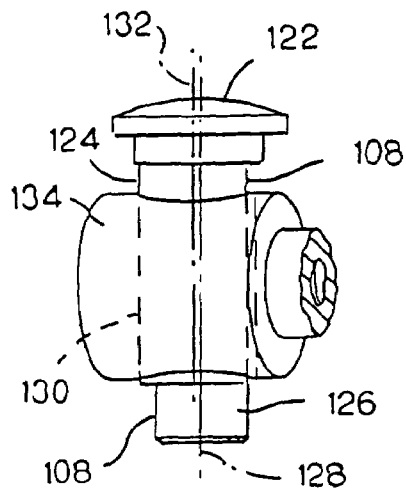
FIG.13
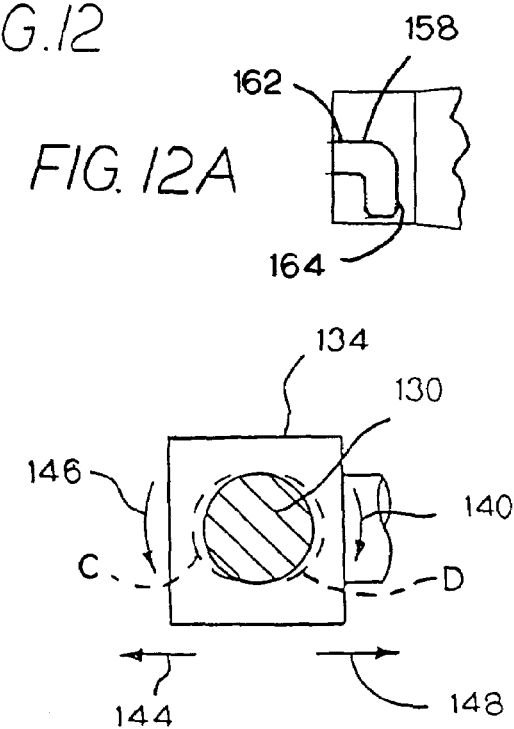
FIG.14

//!MILLING TOOL HOLDER WITH CAMMING PLUG

CROSS-REFERENCE TO RELATED APPLICATION

This application is a continuation-in-part of U.S. patent application Ser. No. 10/693,418 filed Oct. 27, 2003 now U.S. Pat. No. 6,971,825 for A MILLING TOOL HOLDER WITH DIFFERENTIAL SCREW; U.S. patent application Ser. No. 10/883,052 filed Jul. 2, 2004 now U.S. Pat. No. 7,044,695 for MILLING TOOL; and U.S. patent application Ser. No. 10/812,784 filed Mar. 31, 2004 now U.S. Pat No. 6,964,547 for MILLING TOOL HOLDER WITH THREADED PLUG.

BACKGROUND AND SUMMARY OF THE INVENTION

Milling tool holders commonly employ a tool-holding component having a frustoconical male end, and a shank having a female opening for receiving the male end.

Various ways are known in the art for tightly joining the shank to the tool holder.

My prior patent applications disclose novel ways for joining the tool holder and the shank together to prevent the tool from shattering from tool movement such as when used with a hydraulic tool system. My earlier inventions prevent tool deflection and avoid a poorly finished workpiece.

The broad purpose of the present invention is to provide an improved tool holder combination comprising an elongated tool holder having means at one end for supporting a milling tool, a frustoconical tapered midsection and a slotted cylindrical end.

The shank has a frustoconical female opening for receiving the tapered midsection of the tool holder, and an inner cylindrical cavity for receiving the cylindrical end of the tool holder.

In my prior applications I employ an axially movable draw screw in the bore of the shank to engage the tool holder. Turning the draw screw draws the tapered end of the tool holder into the female opening of the shank.

The present invention is illustrated in several embodiments of my invention. Two embodiments use a camming plug for connecting the male and female components together. In one embodiment the shank receives the male end of the tool holder in a position in which a transverse opening in the shank is aligned with a transverse camming opening in the tool holder. The camming plug is inserted in the transverse openings in both the shank and the tool holder. The camming plug has a cylindrical camming structure received in the camming opening of the tool holder in such a manner that when the camming plug is rotated in one direction, it cams the tool holder toward a wedged locked position in the shank. Rotating the camming plug in the opposite direction removes the tool holder from its locked position. This embodiment requires the user to remove the camming plug from both the tool holder and the shank to separate the two components.

In a second embodiment of the invention, I employ a connecting structure inside the female opening of the shank. The connecting structure is axially movable in the shank, and has a camming opening aligned with the camming plug-receiving opening of the shank. The connecting structure also has a latching structure that is connected to the tool holder by rotating the tool holder with respect to the connecting structure.

A camming plug is inserted in both the camming opening in the shank, and the camming opening of the connecting structure. The camming plug has a camming midsection that when turned in one direction axially biases the connecting structure and the tool holder toward a locked position in the shank. The camming plug is rotated in the opposite direction to axially move the tool holder to a release position to quickly separate the tool holder from the shank. The shank can be separated from the tool holder without removing the camming plug.

Other variations of the concept are also disclosed.

Still further objects and advantages of the invention will become readily apparent to those skilled in the art to which the invention pertains, upon reference to the following detailed description.

DESCRIPTION OF THE DRAWINGS

The description refers to the accompanying drawings in which like reference characters refer to like parts throughout the several views, and in which:

FIG. 9 is a longitudinal view of a second embodiment of the invention;

FIG. 10 is an exploded view of the embodiment of FIG. 9;

FIG. 11 is a sectional view of the tool holder male end received in the shank opening;

FIG. 12 is a perspective view of the connecting member latching end and the mating tool holder latching slots;

FIG. 12A is another view of one of the latching slots;

FIG. 13 is an enlarged view of the camming plug in the camming opening of the connecting member;

FIG. 14 is a view of the camming plug in alternate positions;

DESCRIPTION OF THE PREFERRED EMBODIMENT

Figure 1:
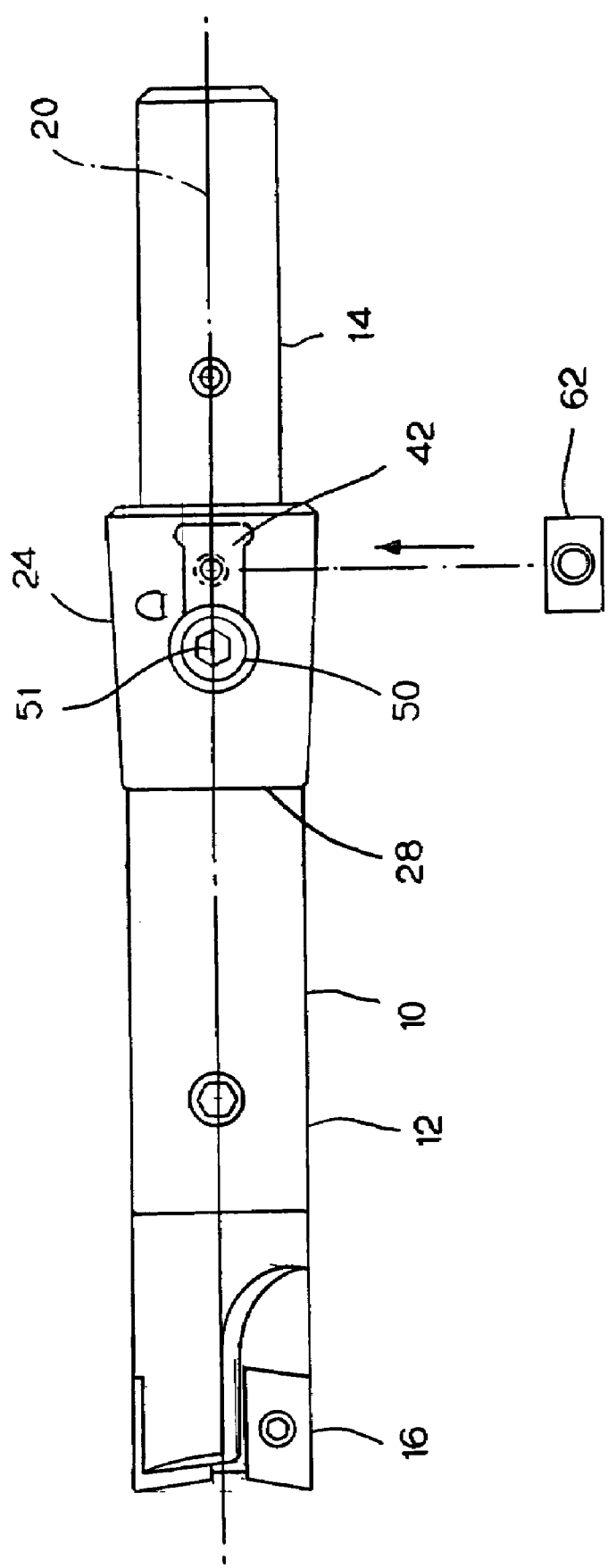
FIG. 1 is a view of a first tool holder embodiment of the invention.

Referring to the drawings, FIG. 1 illustrates a preferred tool holder combination 10 comprising a steel tool holder 12 joined to a steel shank 14. A milling tool 16 is carried either integrally or by a suitable mounting on the outer end of the tool holder.

Figure 2:
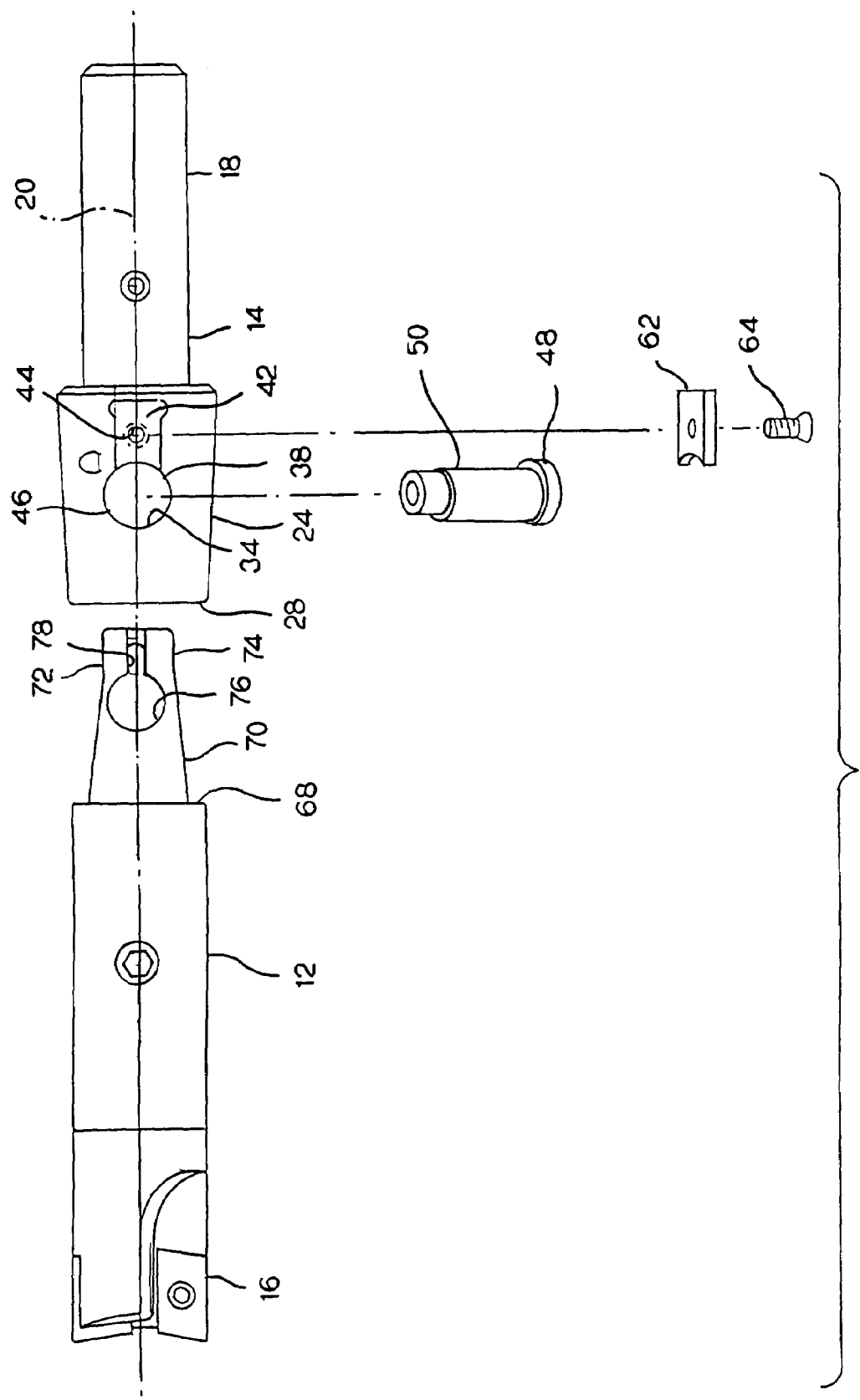
FIG. 2 is an exploded view of the tool holder combination of FIG. 1.
Figure 3:
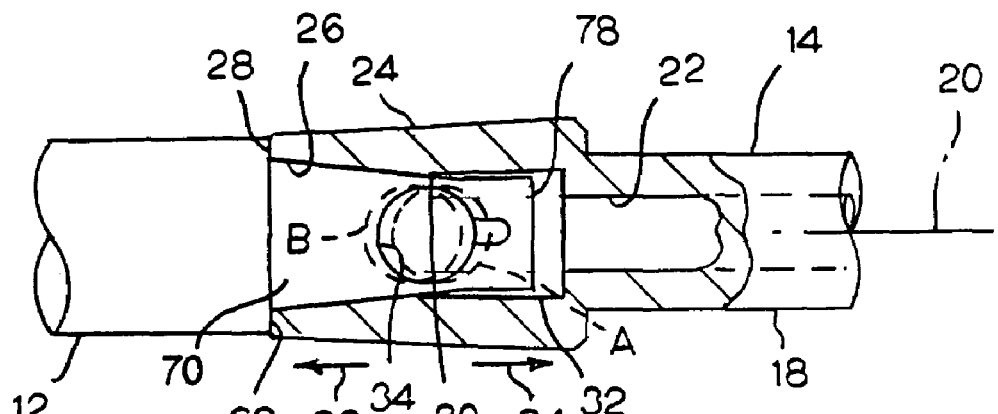
FIG. 3 is a longitudinal sectional view of the tool holder male end received in the shank female opening.

Referring to FIGS. 2 and 3, shank 14 comprises a shaft 18 adapted to be rotated about a turning axis 20 in a manner well known to those skilled in the art. The shaft has an internal axial bore 22 having an outer opening in one end. The other end of the shank has an enlarged head 24 having an inner frustoconical, female opening 26. The outer end of opening 26 terminates in end face 28. The inner end of the female opening merges at 30 with a cylindrical chamber 32 which in turn opens to axial bore 22. Head 24 and female opening 26 are symmetrical around turning axis 20.

Figure 4:
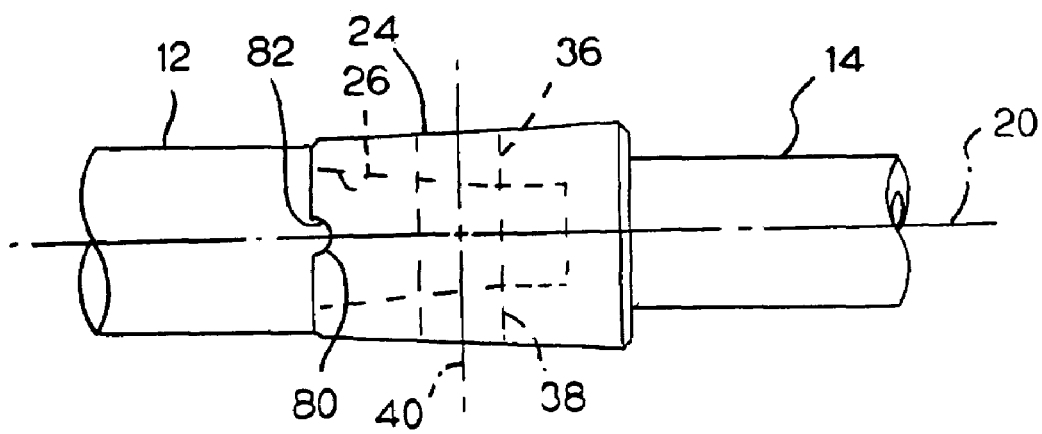
FIG. 4 is another view of the embodiment of FIG. 1.

Referring to FIGS. 2-4, a plug-receiving bore 34 in head 24 extends along an axis 40 transverse to and intersecting turning axis 20. Bore 34 has two aligned openings 36 and 38, extending to opposite sides of head 24, intersecting female opening 26 and slightly overlapping cylindrical chamber 32. Openings 36 and 38 are each cylindrical, and formed along common transverse axis 40.

Figure 8:
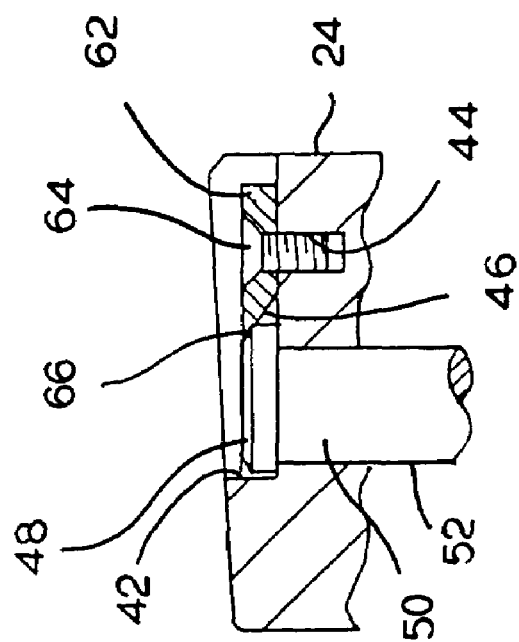
FIG. 8 is a view of the locking mechanism as seen along lines 8-8 in FIG. 7.
Figure 7:
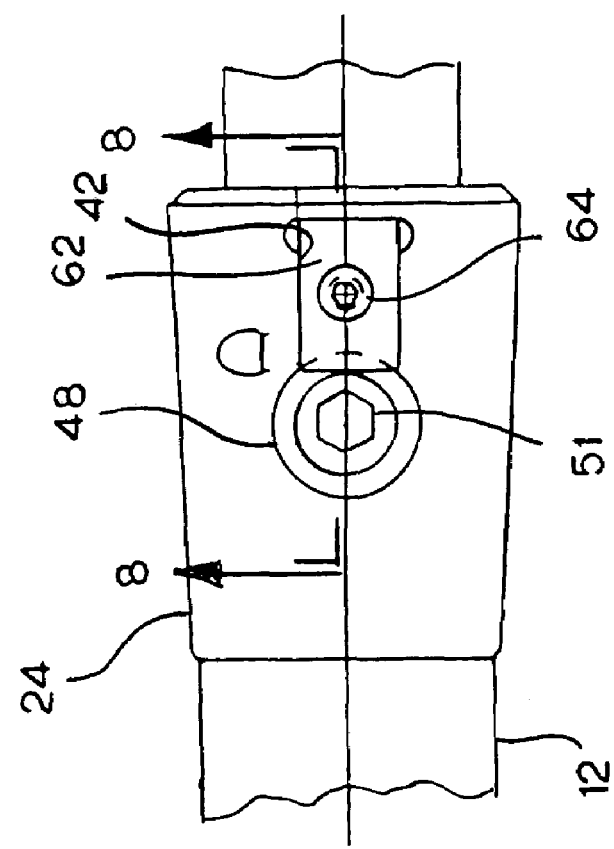
FIG. 7 is an enlarged view of a locking mechanism for locking the camming plug in the cam-receiving opening.

Referring to FIGS. 7 and 8, the outer end of opening 38 terminates with a recess 42. The recess has a threaded bore 44 and forms a concave seat 46 for seating rounded head 48 of a camming plug 50.

Camming plug 50 has a length such it extends from one side of head 24 to the opposite side. The head of the camming plug has a hexagonal opening 51 for receiving a tool for turning the plug in opposite directions.

Figure 5:
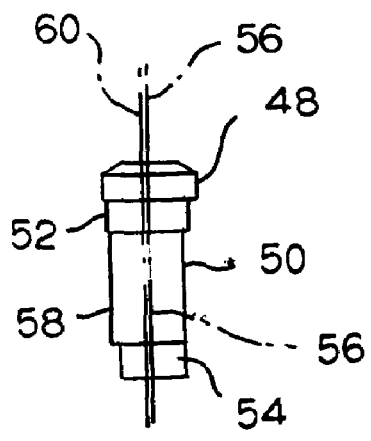
FIG. 5 is a view of a camming plug.
Figure 6:
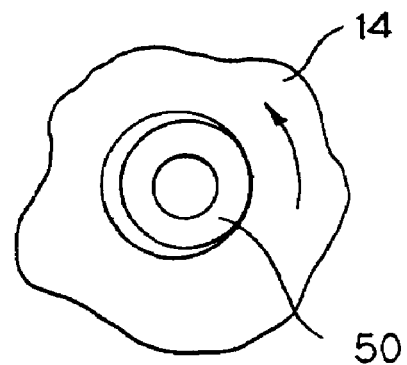
FIG. 6 is an enlarged end view of the camming plug in the camming opening of the tool holder.

Referring to FIG. 5, camming plug 50 has a cylindrical section 52 received in opening 36, and a second cylindrical section 54 received in opening 38. Cylindrical sections 52 and 54 are formed along on a common turning axis 56.

The plug has a cylindrical camming structure 58 between sections 52 and 54 and formed along an axis 60 that is parallel to but offset from axis 56. Camming structure 58 has a sufficiently small diameter that it can be received through opening 36 into female opening 26.

A keeper 62 is seated in recess 42 and locked in position by a threaded fastener 64, as best shown in FIGS. 7 and 8. The edge of the keeper at 66 slightly overlaps rounded head 48 of the camming plug to restrain its removal from the plug-receiving bore.

Referring to FIGS. 2 and 3, tool holder 12 has an annular seat 68 which defines the larger end of a frustoconical male section 70. The male section is received into female opening 26 of the shank until end face 28 abuts seat 68. The extreme end 74 of the male section is cylindrical and slidably received in cylindrical chamber 32 of the shank.

Referring to FIG. 2, male section 70 has a cylindrical camming bore 76 formed on an axis that is perpendicular to turning axis 20 of the shank, and slightly overlapping cylindrical end 74 of the male section. Cylindrical end 74 has a pair of axial slots 78 on opposite sides of the cylindrical end. The axial slots open at one end to camming bore 76, and extend to about ⅛" from the extreme end of the male section.

Referring to FIG. 4, the tool holder has a short axial extension 80 received in a complementary opening 82 of the shank in such a manner that when the shank is fully seated in the tool holder, extension 80 prevents rotation of the tool holder with respect to the shank.

In use, the male end of the tool holder is inserted into the female opening of the shank, disposing extension 80 into recess 82. Camming plug 50 is then inserted into bore with camming structure 58 disposed in camming bore 76 of the tool holder. In this position, the camming plug is locked against radial motion by means of keeper 62 and threaded fastener 64, but can be turned in opposite directions by a suitable tool.

Referring to FIG. 3, the camming plug is turned to rotate camming structure 58 toward position A, shown in phantom, to bias the tool holder in the direction of arrow 84, to a locked position. The camming structure then slightly enlarges and wedges cylindrical end 74 in cylindrical chamber 32.

The camming plug is turned in the opposite direction to move the camming structure toward a position illustrated in phantom at B, in the direction of arrow 86 to bias and release the tool holder from its locked position in the shank.

In this embodiment, camming plug 50 must be removed from plug-receiving bore 34 to separate the tool holder from the shank. When the camming structure has biased the tool holder toward its locked position, a tight engagement exists between end face 28 of the shank and shoulder 68 of the tool holder; between the frustoconical portion of male section 70 in female opening 26; and between cylindrical chamber 32 and cylindrical end 74 of the male end.

FIGS. 9 and 10 illustrate another tool holder combination 100 comprising a shank 102 having a head 104, a tool holder 106 and a camming plug 108. This embodiment is similar to the embodiment of FIG. 1, except that the tool holder can be separated from the shank without removing the camming plug from the shank.

Referring to FIG. 11, shank 102 has a frustoconical female opening 110 which terminates with end face 111. The inner end of opening 110 merges with cylindrical chamber 112. The shank has a transverse plug-receiving opening 114 which extends through and intersects cylindrical chamber 112. Camming plug 108 is disposed in opening 114 on a turning axis 116 that intersects the turning axis 119 of the shank. The upper end of opening 114 has a recess 117 for receiving keeper 118. A fastener 120 engages head 122 of the camming plug to restrain it from being removed from opening bore 114, but permitting the camming plug to be rotated by a suitable tool.

Referring to FIG. 13, camming plug 108 has a cylindrical section 124 adjacent rounded head 122 received in the upper end of plug-receiving opening 114. A bottom cylindrical section 126 is received in the opposite end of plug-receiving opening 114. Both sections 124 and 126 turn about a turning axis 128. Camming plug 108 has an intermediate cylindrical camming structure 130 turnable about an axis 132 that is parallel and offset from axis 128.

Connecting member 134 is disposed in cylindrical chamber 112, as best shown in FIGS. 11-13. Connecting member 134 has a cylindrical neck 136 slidably received in cylindrical chamber 112. The connecting member has a camming bore 138 aligned with plug-receiving opening 114 for receiving the camming plug.

Referring to FIG. 14, rotating the camming plug in direction 146, moves the connecting member in direction 148 to a locked position D in chamber 112. Rotating the camming plug in the opposite direction 140 moves the connecting member in the direction of arrow 144, to a release position C.

The connecting member has an axial bore 150 and a cylindrical neck 152 that extends from the end of cylindrical neck 136 and carries a pair of latching ears 154 and 156 on opposite sides of neck 152.

Tool holder 106 has a frustoconical male section 107 and a cylindrical end 107a having a pair of L-shaped, latching slots 158 and 160. Each slot comprises an axial section 162 that extends from the end face of the cylindrical end of the tool holder to a short circumferential section 164. The arrangement is such that ears 154 and 156 are received into slots 158 and 160, by an axial motion. Turning the tool holder in the direction of arrow 166, moves the ears into circumferential sections 164. In this position, the tool holder moves axially with the connecting member.

In use, the cylindrical neck 136 of the connecting member is received in cylindrical chamber 112 of the shank. The camming plug is then inserted in plug-receiving opening 114 to dispose camming structure 130 in camming bore 138 of the connecting member. The tapered male end of the tool holder is then introduced into frustoconical female opening 110 until the slots in the end of the tool holder receive ears 154 and 156. The tool holder is then turned to lock the ears in slots 158 and 160.

In this position, cylindrical end 107a of the tool holder is received in the cylindrical chamber 112 of the shank. Rotating the camming plug in one direction axially moves both the connecting member and the tool holder toward a locked position in the shank, and the inner end of the male section of the tool holder toward a wedged position in female opening 110. Turning the camming plug in the opposite direction releases the tool holder from its wedged position 50 so that ears 154 and 156 can be easily rotated in slots 158 and 160 for separating the tool holder from the shank.

Figure 15:
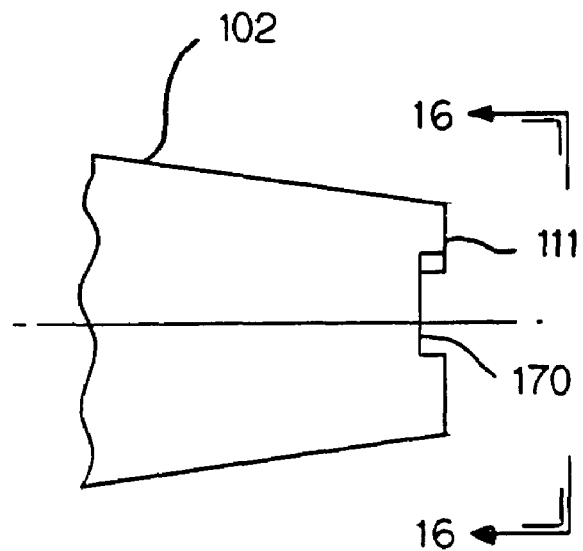
FIG. 15 is a fragmentary view of the end of the shank.
Figure 16:
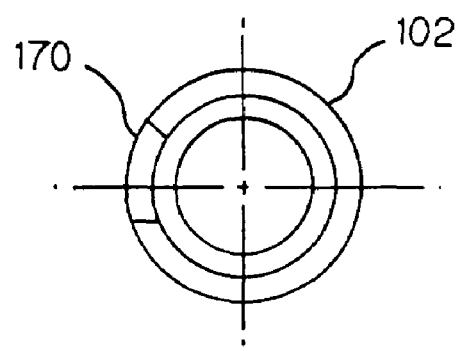
FIG. 16 is a view of the shank end as viewed along lines 16-16 of FIG. 15.
Figure 17:
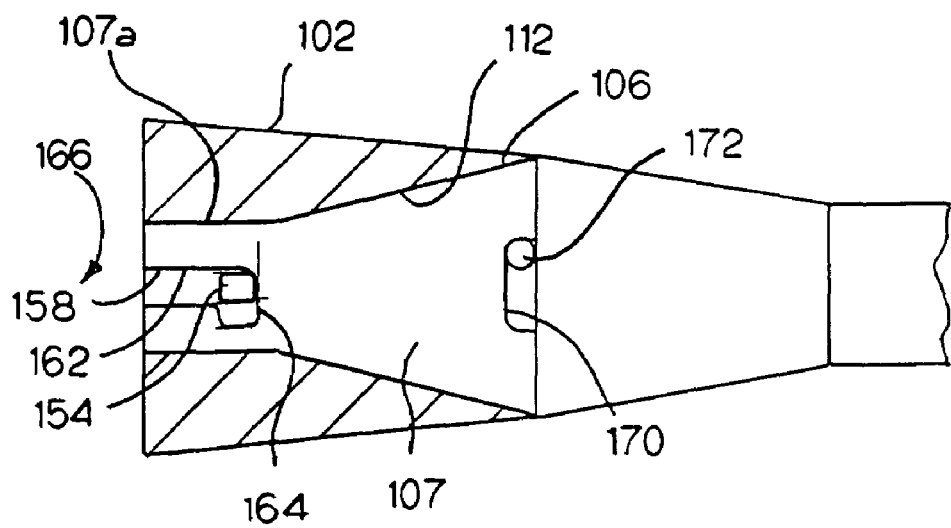
FIG. 17 is another longitudinal partially sectional view of the invention.
Figure 18:
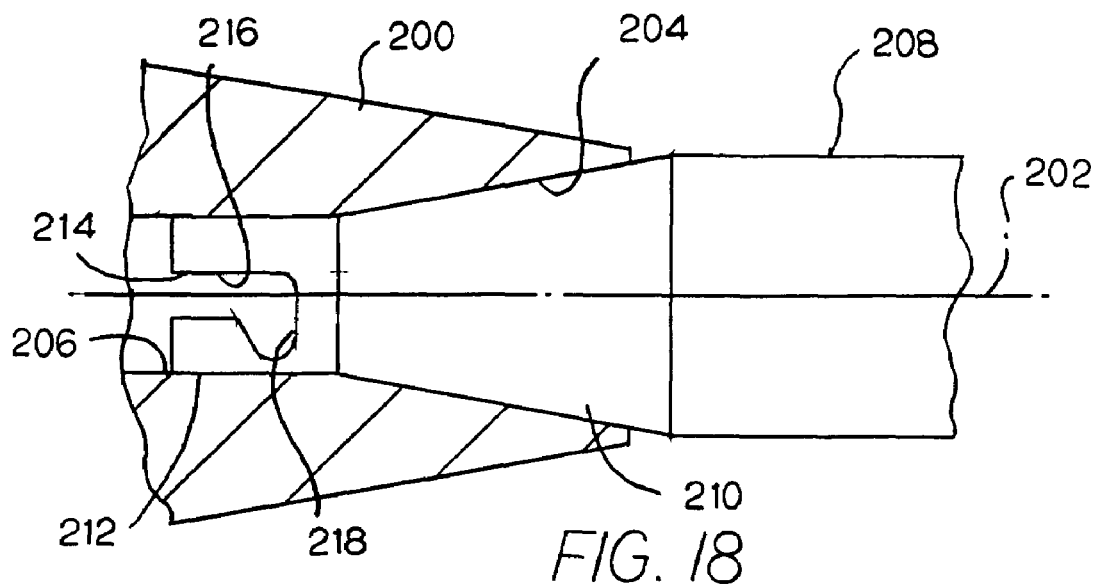
FIG. 18 is a partially sectional view of another embodiment of the invention.
Figure 19:
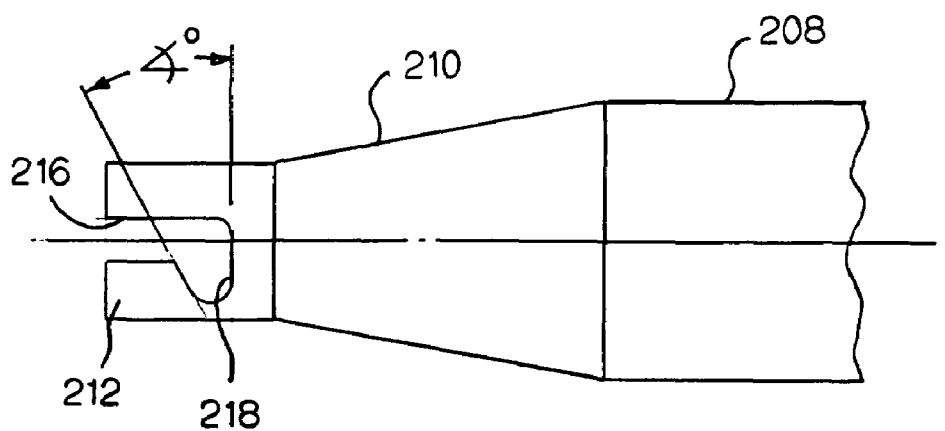
FIG. 19 is a view of the modified slot structure of the tool holder end.

Referring to FIGS. 15-17, shank end face 111 has a slot 170. The tool holder has a radially extending pin 172 received in slot 170 when the tool holder frustoconical midsection is fully received in the shank opening. Slot 170 is elongated to permit the tool holder to be rotated toward the bottom end of slot 170, as viewed in FIG. 17, as ear 154 is rotated in slot 158. In this locked position, the shank can drive the tool holder in a cutting motion.

FIGS. 18-21 illustrate another embodiment of the invention. In this case, shank 200, adapted for rotation about a driving axis 202, has a frustoconical opening 204. The inner narrow end of the frustoconical opening merges with an elongated cylindrical locking chamber 206.

A tool holder 208 has a tapered or frustoconical midsection 210 received into opening 204 to a wedged position. Frustoconical midsection 210 merges with a cylindrical structure 212 that is slidably received in locking chamber 206. Cylindrical structure 212 has a slot 214 having an axial section 216 which terminates with a circumferential or transverse section 218. Note that one side of slot 218 is formed with a camming angle of about 4° with respect to the inner end of the slot.

The shank has a transverse pin 220 which spans cylindrical locking chamber 206, and intersects axis of rotation 202. In this arrangement, the tool holder is coupled to the shank by inserting the tapered section of the tool holder into opening 204 until axial portion 216 of the slot receives pin 220. Then turning the tool holder with respect to the shank, the tool holder is cammed toward a locked position, that is, toward the left as viewed in FIG. 19.

FIGS. 22-25 illustrate another embodiment of the invention. It includes a connecting structure 240 having an elongated neck 242. Connecting structure 240 has a camming bore 244 for receiving the camming plug, not shown, mounted in the shank.

The camming bore is formed about an axis that is transverse to the turning axis 20 of the tool holder.

Connecting member neck 242 has a pair of laterally extending latching ears 246 and 248. Each of the ears has a generally rectangular cross-section which includes a camming surface 249 disposed at an angle about 4° with respect to the inner side of the ear. The two camming ears 246 and 248 are disposed in a lateral direction and at right angles to the axis of camming bore 244.

Figures 20, 21:
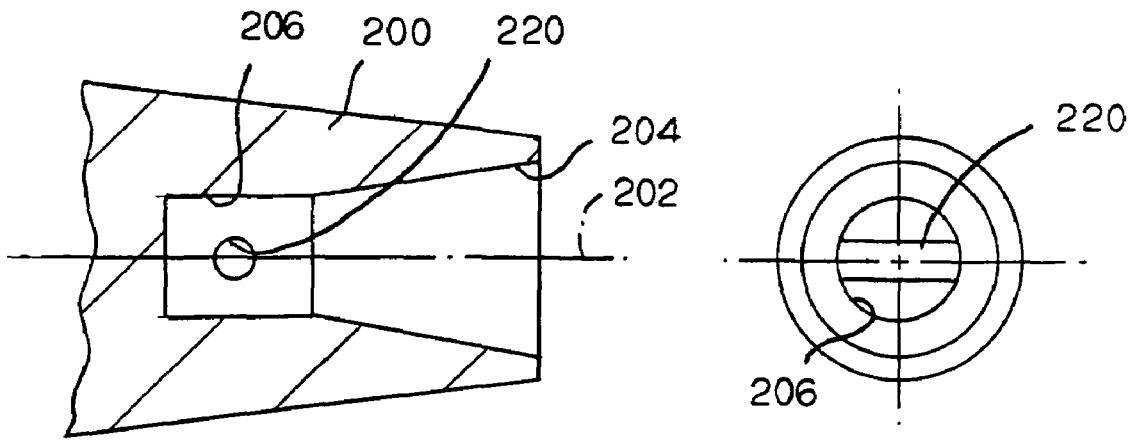
FIG. 20 is a sectional view of the shank, showing a drive pin.
FIG. 21 is a view of the shank-receiving end of the shank.
Figure 22:
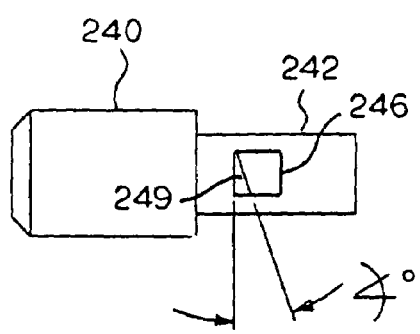
FIGS. 22-25 illustrate another embodiment of the invention.
Figure 24:
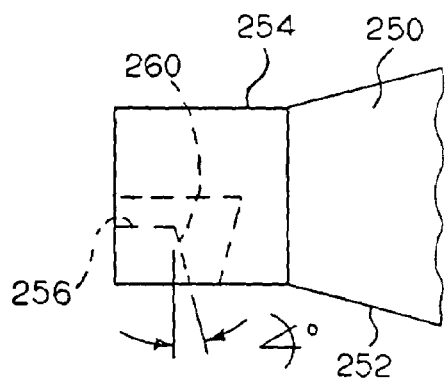
Figure 23:
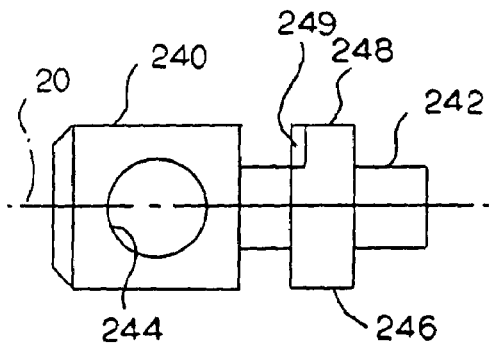
Figure 25:
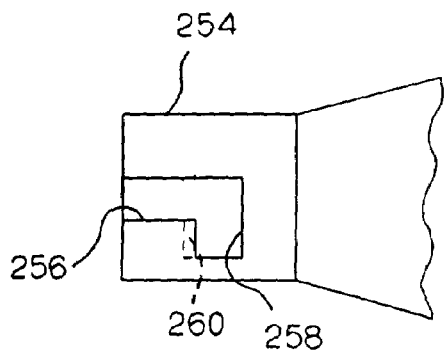

Tool holder 250 has a tapered midsection 252 received in the female tapered opening of the shank, and a cylindrical axial extension 254 received in a locking chamber, such as at 206, illustrated in FIG. 20.

Axial extension 254 is hollow for receiving the end of the neck, and includes a pair of axial slots 256, only one shown. Axial slot 256 has an inner lateral slot extension 258 for receiving one of the ears 246 or 248. The outer lateral surface 260 of slot 258 forms a camming surface that is complementary to the camming surface 249 of the latching ear.

In this case, the tool holder is joined to the connecting member by inserting axial extension 254 into the shank opening until slots 256 receive camming ears 246 and 248 and then turning the tool holder. As the tool holder is turned, camming surface 249 on each latching ear axially moves camming surfaces 260 to the left as viewed in FIG. 24, and a fully latched position. This arrangement also permits the tool holder to be easily separated from the shank by turning the tool holder in the opposite direction.

Figure 26:
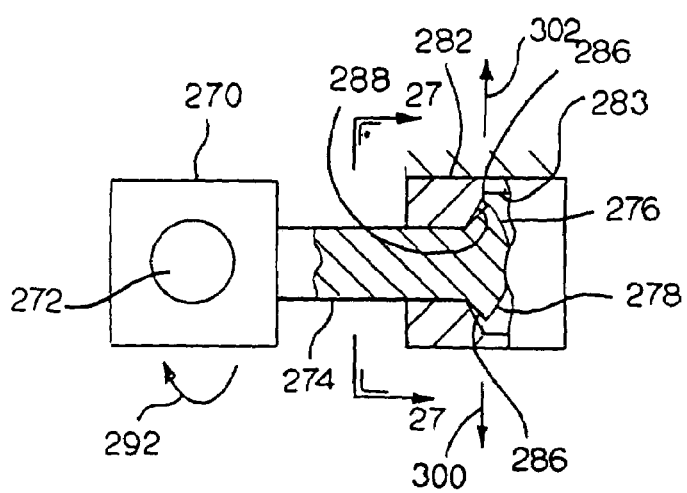
FIG. 26 illustrates a still further embodiment of the invention in which the end of the tool holder is expanded to tightly wedge the cylindrical locking structure in the locking chamber.
Figure 27:
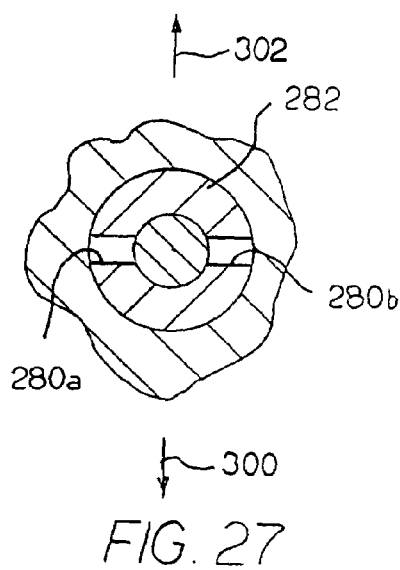
FIG. 27 is a sectional view as seen along lines 27-27 of FIG. 26.

FIGS. 26 and 27 illustrate still another embodiment of the invention in the form of a cylindrical connecting structure 270 having a lateral bore 272 for receiving a camming plug. This embodiment includes a neck 274 with a pair of ears 276 and 278 receivable between a pair of slots 280, 280a and 280b in cylindrical extension 282 of the tool holder. In this case, the cylindrical extension snugly slidably fits in shank locking chamber 283. The inner surface 286 of the camming ears then cammed the tapered surface 288 of the locking chamber.

When a camming plug in bore 272 is turned in the direction of arrow 292, ears 276 and 278 of the tool holder cause the opposite sides of slots 280a and 280b to expand in the direction of arrows 300 and 302 to provide a further wedging engagement between extension 282 and the camming ears.

This arrangement also permits the tool holder to be separated from the shank without removing the camming plug by merely turning the camming plug in a reverse direction to release the two sides of slots 280a and 280b thereby permitting cylindrical extension to contract sufficiently so that the tool holder can be rotated to separate it from the shank.

Thus, I have described an improved tool holder apparatus in which the shank and the tool holder are joined by a connecting member which is turned by a camming plug toward either a locked or a release position.

I claim:

1. A tool holder apparatus, comprising:
   an elongated shank intended to be supported for rotation about a shank-turning axis, said shank having an internal frustoconical female opening, and a plug-receiving bore intersecting the female opening;
   an elongated tool holder for supporting a cutting tool in a cutting position, the tool holder having an external frustoconical male structure receivable in the female opening of the shank to a locked position, and a camming opening aligned with the plug-receiving bore of the shank when the male structure is received in the female opening;

a camming plug having a first section disposed in the plug-receiving bore so as to be rotatable about a plug-turning axis, the camming plug having camming structure receivable in the camming opening of the tool holder and engageable therewith such that as the camming plug is rotated in a first direction, the camming structure cams the tool holder in a first axial direction toward said locked position with the shank, and as the camming plug is rotated in an opposite direction, the camming structure cams the tool holder in an opposite axial direction, away from said locked position with the shank.

2. The tool holder apparatus as defined in claim 1, in which the tool holder has a shoulder disposed adjacent the male structure, and the shank has an end face abutting the shoulder when the male structure is in said locked position.

3. The tool holder apparatus as defined in claim 2, in which the annular shoulder has an axially extending structure receivable in an axial opening in the end face of the shank to prevent rotation of the tool holder with respect to said shank.

4. The tool holder apparatus as defined in claim 1, in which the tool holder has an annular shoulder disposed about said shank-turning axis, and the shank has an annular end face engageable with said annular shoulder when the tool holder is in said locked position.

5. The tool holder apparatus as defined in claim 1, in which the plug-receiving bore has a first section on a first side of the female opening and a second section on the opposite side of the female opening, and the camming plug has a first plug section with a cylindrical bearing surface disposed in said first section of the plug-receiving bore, and a second plug section having a cylindrical bearing surface disposed in the second section of the plug-receiving bore when the male structure is disposed in said female opening.

6. The tool holder apparatus of claim 1, in which the camming structure of the camming plug has a cylindrical surface engaging the camming opening of the tool holder, the cylindrical surface being rotatable about an axis offset from the plug-turning axis of the camming plug.

7. The tool holder apparatus as defined in claim 1, in which the tool holder has an axial bore connected to the plug-receiving bore of the shank, an end face, and an axial slot disposed between said end face and the camming opening to form a radially expandable section, operative to wedge the tool holder in the female opening of the shank.

8. The tool holder apparatus as defined in claim 7, in which the radially expandable section of the tool holder has an exterior cylindrical surface, and the female opening of the shank has an interior cylindrical chamber for receiving the radially expandable section of the tool holder.

9. The tool holder apparatus as defined in claim 8, in which the tool holder has a shoulder disposed adjacent the male structure, and the shank has an end face abutting the shoulder when the male structure is in said locked position.

10. The tool holder apparatus as defined in claim 1, in which the shank-turning axis intersects the plug-turning axis.

11. The tool holder apparatus as defined in claim 1, including releasable locking structure on the shank engageable with the camming plug for preventing movement thereof out of said plug-receiving bore.

12. A tool holder apparatus, comprising:

an elongated shank intended to be supported for rotation about a shank-turning axis, said shank having an internal frustoconical female opening at one end thereof, and a transverse plug-receiving bore intersecting the female opening;

an elongated tool holder having means for supporting a cutting tool in a cutting position, and an external frustoconical male structure receivable in the female opening of the shank;

the male structure having an inner end with a first latching structure;

a camming plug rotatably mounted in the plug-receiving bore and having a camming structure disposed in the female opening of the shank;

a connecting structure axially moveable in the female opening, and having a camming opening aligned with said plug-receiving bore for receiving the camming plug such that as the camming plug is rotated in a first direction, the connecting structure is moved in a first axial direction toward a locked position, and as the camming plug is rotated in an opposite direction, the connecting structure is biased in an opposite axial direction toward a release position, the connecting structure having a second latching structure engageable with the first latching structure of the tool holder such that as the connecting structure is moved toward said locked position, the male structure of the tool holder is wedged in the female opening.

13. The tool holder apparatus as defined in claim 12, in which the tool holder has an annular shoulder disposed about said shank-turning axis, and the shank has an annular end face engageable with said annular shoulder for limiting the rotational movement of the male structure in the female opening.

14. The tool holder apparatus as defined in claim 12, in which the plug-receiving bore has a first section on a first side of the female opening and a second section on the opposite side of the female opening, and the camming plug has a first plug section with a cylindrical bearing surface disposed in said first section of the plug-receiving bore, and a second plug section having a cylindrical bearing surface disposed in the second section of the plug-receiving bore.

15. The tool holder apparatus as defined in claim 12, in which the shank-turning axis intersects a plug-turning axis of the camming plug.

16. The tool holder apparatus as defined in claim 12, including releasable locking structure on the shank engageable with the camming plug for preventing movement thereof out of said plug-receiving bore.

17. The tool holder apparatus as defined in claim 12, in which the connecting structure has a radial ear, and the tool holder has a slot whereby the connecting structure is connected to the tool holder by inserting the radial ear into the slot of the tool holder, and then rotating the tool holder with respect to the connecting member.

18. A tool holder apparatus, comprising:

an elongated shank intended to be supported for rotation about a shank-turning axis, said shank having an internal female opening;

a locking pin disposed in said female opening, at right angles to said shank-turning axis;

an elongated tool holder for supporting a cutting tool in a cutting position, the tool holder having an external male structure receivable in said female opening, and a slot for receiving said locking pin, including an axial slot section for receiving the locking pin by an axial motion of the tool holder, and a transverse slot section for receiving the locking pin by rotating the tool holder with respect to the shank, the transverse slot section having a camming side disposed at an angle with respect to the shank-turning axis and engageable with the locking pin such that as the tool holder is turned with respect to the shank, the locking pin cams the camming side of the transverse slot section to move the tool holder in an axial direction to a locked position.

19. A tool holder apparatus as defined in claim 18, in which the shank has an axial slot and the tool holder has a radial pin received into said slot to drive the tool holder in a rotating motion as the shank is being rotated.

\* \* \* \* \*